United States Patent Office 2,808,384
Patented Oct. 1, 1957

2,808,384

POLY-CHLOROTRIFLUOROETHYLENE DISPERSIONS CONTAINING A TRIHYDRIC ALCOHOL

Karl Gerbel and Enno Huss, Leverkusen-Bayerwerk, Germany, assignors to Farbenfabriken Bayer Aktiengesellschaft, Leverkusen, Germany, a corporation of Germany No Drawing. Application November 2, 1954, Serial No. 466,439

4 Claims. (Cl. 260—29.6)

This invention relates to stable dispersions of poly-chlorotrifluoroethylene.

It is known that mixtures of saturated aliphatic monohydric alcohols and saturated aliphatic dihydric alcohols can be used to prepare stable dispersions from poly-chlorotrifluoroethylene.

We have now found that saturated aliphatic trihydric alcohols can be successfully used in the same way, and that then alcohols containing a different number of hydroxyl groups need not be present. It is also possible to add a non-alcoholic solvent, such as an ester or aromatic hydrocarbon. A limited quantity of water may also be added.

The dispersions may be used in known manner to coat surfaces, for example as a lacquer for containers, reaction vessels, and fittings.

The advantage of the invention is that a dispersion prepared with these dispersing agents settles much more slowly than one prepared by the known process, as is shown by the following comparative experiment:

A dispersion is prepared by the known process from 30 parts by weight of poly-chlorotrifluoroethylene, 35 parts by weight of ethylene glycol and 35 parts by weight of ethyl hexanol. When 100 cc. of this dispersion are introduced into a vertical cylinder having a diameter of 2.9 cm., the polymer settles to such an extent that within 24 hours there are 18 cc. of supernatant solvent mixture. If solvent mixtures according to the invention are employed under exactly identical conditions, the following values are obtained:

| Solvent mixture | Supernatant Solvent mixture, cc. |
|---|---|
| 1. Hexane-triol: methyl glycol acetate, 50:50 | 5 |
| 2. Trimethylol propane: methyl glycol acetate, 17.5:52.5 | 11 |
| 3. 1,2,4-trihydroxybutane: methyl glycol acetate: water, 17.5:26.5:26 | 4 |

From this comparison it is evident that a considerably more stable dispersion is obtained by using the process of the present invention.

The following examples further illustrate the invention:

*Example 1*

30 parts by weight of poly-chlorotrifluoroethylene are crushed in a micro-mill to a mean particle size of 3–12 and then milled in a ball mill for 24 hours together with 70 parts by weight of hexane-triol. A stable dispersion results.

*Example 2*

A dispersion was produced as in Example 1, but instead of 70 parts by weight of hexane-triol a mixture of 35 parts by weight of glycol monomethyl ether acetate was used.

*Example 3*

A dispersion was produced as in Example 1, but instead of 70 parts by weight of hexane-triol a mixture of 30 parts by weight of hexane-triol, 30 parts by weight of glycol monomethyl ether acetate and 10 parts by weight of xylene was used.

*Example 4*

A dispersion was produced as in Example 1, but instead of 70 parts by weight of hexane-triol a mixture of 15 parts by weight of trimethylol propane and 55 parts by weight of glycol monomethyl ether acetate was used.

*Example 5*

A dispersion was produced as in Example 1, but instead of 70 parts by weight of hexane-triol a mixture of 17 parts by weight of 1:2:4-trihydroxybutane, 28 parts by weight of glycol-monomethyl ether acetate and 25 parts by weight of water was used.

We claim:

1. A stable dispersion of finely divided high-molecular weight poly-chlorotrifluoroethylene containing a member selected from the group consisting of hexene-triol, trimethylol-propane, and 1,2,4-trihydroxybutane, as the sole alcoholic stabilizing agent.

2. A stable dispersion according to claim 1 wherein the dispersion medium contains methyl glycol acetate.

3. A stable dispersion according to claim 2, wherein the dispersion medium contains water.

4. A stable dispersion according to claim 2, wherein the dispersion medium contains xylene.

References Cited in the file of this patent

UNITED STATES PATENTS

| 2,542,071 | Sprung | Feb. 20, 1951 |
| 2,656,330 | Sprung | Oct. 20, 1953 |